United States Patent Office.

EDMUND H. HAGUE, OF JACKSON, MICHIGAN, ASSIGNOR OF ONE-THIRD TO WALTER JOHNSON, OF SAME PLACE.

PAINT.

SPECIFICATION forming part of Letters Patent No. 297,074, dated April 15, 1884.

Application filed October 13, 1883. (Specimens.)

*To all whom it may concern:*

Be it known that I, EDMUND H. HAGUE, a citizen of the United States, residing at Jackson, in the county of Jackson and State of Michigan, have invented certain new and useful Improvements in Paint, of which the following is a specification.

This invention relates to a novel composition of matter which is to serve as a paint for wood, metal, stone, brick, &c. When applied to wood and other combustible or easily-decomposed material, it protects them from the action of moisture and makes them also in a measure fire-proof. When applied to iron or other metals, it prevents them from getting oxidized or from being otherwise affected objectionably by means of the natural agents which unite chemically with metals. When applied to stone, brick, and similar materials, the paint excludes moisture therefrom and prevents the destruction of such materials by the action of frost, which, as is well known, results in a crumbling of materials which can absorb more or less water.

In making the composition I use the following ingredients, mixed or combined in substantially the proportions below set forth and under substantially the conditions indicated: I take forty-five gallons of coal-tar and mix therewith one hundred and twenty-five pounds of china-clay, twelve pounds of alum, twenty-three pounds of salt, and six pounds of black oxide of manganese. In mixing the materials together the coal-tar should be heated to a sufficiently-high temperature, and the other ingredients added while it is hot, the whole being thoroughly mixed by stirring or otherwise. After this treatment the composition is ready to be applied by a brush in the manner followed in painting.

While I have above indicated the proportions of the various ingredients which I prefer to use, yet I do not wish to be limited to the exact weight or volumes, as they may be more or less varied without departing from the essential features of the invention.

If the paint be applied in the condition resulting from the above treatment, it will be found after drying to have a dark slate color. Instead of this, a bright luster may be imparted to it by adding to a quantity of the composition of the above weight about twenty pounds of sulphur at the time the ingredients are being mixed together.

The first three ingredients above named—to wit, the coal-tar, the china-clay, and alum—form the body of the paint. The salt added thereto keeps it pliable and prevents it checking or cracking by the action of frost, and also prevents the burning of combustible materials to which the paint may be applied. The black oxide of manganese causes the paint to dry quickly, it acting here substantially as in other paints where it is used as drier.

The paint which I produce can be applied to many materials, as fences, (metallic and wooden,) buildings, walls, &c. It is especially useful for painting roofs, whether made of shingles, metal, or felt, it filling up the pores and crevices, and even when the roofs are old and leaky they are made water-proof; but I do not wish to limit it to any particular use, the invention relating to the composition itself.

I am aware of the fact that other compositions have been heretofore made, some having one and some another of the ingredients which I have designated above; but I believe myself to be the first to have found that the said ingredients, combined in substantially the proportions and under the conditions named, provide an effective fire-proof, water-proof, and preservative compound applicable to the purposes named.

Attempts have been made to use tar heretofore in the production of paint; but in those compounds with which I am acquainted the tar has been so treated or has been combined with such other materials as to produce a compound very inferior to mine in respect to its action as a whole and the action of the various ingredients; and, moreover, those which have employed this material as an ingredient have been far too expensive to make the compounds available in the arts.

It is well known that tar of the character mentioned has incident to it serious disadvantages which must be overcome, and which in the compounds heretofore produced have not been overcome. It is extremely combustible; it hardens, cracks, and loses its adhesive qualities under some temperatures. When heated hot enough to be readily applied, it runs and forms streaks on the painted surface, it not having "body" or adhesiveness to permit its being applied evenly with a brush. Even when it is applied (under the conditions heretofore known) it is not a true paint, but remains simply coal-tar smeared upon the surface to which it is applied.

In the compounds above alluded to as heretofore employed, use has been made of one or another of the mineral oxides, of ores, sand, alkalies, and acids. Now, materials of the nature of the mineral oxides, ores, sand, &c., fail to accomplish the main requisite in using tar to make a paint, which is to provide a material that shall give the paint sufficient body. They fail in that they are not held properly in suspension, but settle from the tar, permitting it to become free, either while in the vessels or after it is on the surface to which it is applied. The materials which I have combined with it are suspended in the tar to such an extent as to make it a true paint, which can be applied in such a way as to form a heavy, smooth, and firm coat. Those compounds which have contained such ingredients as carbonate of soda, chloride of lime, sulphate of ammonia, lime, lye, potash, lime-water, borax, and other materials which are alkaline or more or less similar to the alkalies have been very deficient, in that (as has been found) such materials decompose and seriously impair the tar, acting to "kill the life of the paint." It is in these respects that I have found the composition which I have described to be superior to those experimented with heretofore—namely, in that it dispenses with the use of alkaline materials on the one hand, and on the other with metallic ores and heavy materials which cannot be held in suspension in the tar while the latter remains in a comparatively pure state.

What I claim is—

The herein-described composition of matter, to be used as a paint for preserving materials to which it is applied and rendering them fire-proof and water-proof, it consisting of the following materials, combined in substantially the proportions and under the conditions named, to wit: coal-tar, sulphur, china-clay, alum, salt, and black oxide of manganese, substantially as set forth.

In testimony whereof I affix my signature in presence of two witnesses.

EDMUND H. HAGUE.

Witnesses:
DANIEL A. FERGUSON,
JEROME H. HOWARD.